United States Patent [19]

Watanabe

[11] 4,448,369
[45] May 15, 1984

[54] TAPE THREADING DEVICE

[75] Inventor: Michinori Watanabe, Odawara, Japan

[73] Assignee: Hitachi, Ltd., Tokyo, Japan

[21] Appl. No.: 382,102

[22] Filed: May 26, 1982

[30] Foreign Application Priority Data

May 29, 1981 [JP] Japan .................................. 56-81067

[51] Int. Cl.³ ........................... G03B 1/04; G03B 1/56; G11B 15/32
[52] U.S. Cl. ..................................... 242/195; 226/91; 226/97
[58] Field of Search ...................... 242/71.8, 182, 195, 242/197–200, 208–210; 226/95, 97, 7, 91, 92; 307/118; 352/157, 158

[56] References Cited
U.S. PATENT DOCUMENTS
3,398,913  8/1968  Orlando ............................. 242/71.8

Primary Examiner—Leonard D. Christian
Attorney, Agent, or Firm—Antonelli, Terry & Wands

[57] ABSTRACT

An automatic tape threading device suitable for use with a tape system including a supply reel and a takeup reel arranged vertically in superposed relation one above the other. The device includes a threading chute allowing a tape payed out of the supply reel to slide downwardly thereon, a tape transporting passage extending downwardly from the lower end of the threading chute and a roller interposed between the threading chute and the transporting passage for changing the direction of movement of the tape and guiding same. An air jet stream is ejected from near the top of the roller toward the tape transporting passage, to as to positively introduce the leading end of the tape to the tape transporting passage.

3 Claims, 2 Drawing Figures

TAPE THREADING DEVICE

BACKGROUND OF THE INVENTION

This invention relates to an automatic tape threading device of a magnetic tape system having a supply reel and a takeup reel arranged vertically.

In this specification, the term "threading" refers to passing a magnetic tape wound on a supply reel through a passage facing a magnetic head after paying its leading end portion out of the supply reel to be wound on a takeup reel, and the term "automatic threading" refers to an operation for performing the aforesaid process automatically. Automatic threading is described in detail in for example U.S. Pat. Nos. 3,398,913 and 3,473,042.

For a magnetic tape system including a supply reel and a takeup reel arranged vertically in superposed relation, it has been the usual practice to use a method of automatic threading of the magnetic tape which relies on the force of gravity for inserting the leading end of the magnetic tape payed out of the supply reel to the passage. More specifically, the magnetic tape, payed out of the supply reel slide on a threading, drops by its own weight on to a roller, located at the inlet of the passage, to be transported to a predetermined position.

Some disadvantages are associated with this method of the prior art. For example, when a magnetic tape is allowed to drop by its own weight, the tape is attracted to the roller and jammed. Also, the leading end portion of the magnetic tape, payed out of the supply reel and sliding on the threading chute, tends to pass by the roller by moving thereabove.

SUMMARY OF THE INVENTION

Accordingly the invention has as its object the provision of an automatic tape threading device capable of positively introducing the leading end of a magnetic tape into a predetermined position, to increase performance of the automatic threading device.

According to the invention, there is provided an automatic tape threading device comprising a tape chute for a magnetic tape payed out of a supply reel to slide downwardly thereon, a roller located in the vicinity of a lower end of the tape chute for altering the direction of movement of the magnetic tape and guiding its movement, and an air jet ejecting port for blowing a stream of air jet from between the roller and the threading chute so that the magnetic tape has its leading end oriented by the air jet toward the roller to positively transport the tape to a predetermined position. To avoid the magnetic tape having a static buildup being attracted to the surface of the roller, the tape is moved away from the surface of the roller by the air jet while keeping a small clearance between them. A thrust is imparted by the air jet to the leading end of the tape to keep the tape from buckling. By virtue of these features, the magnetic tape can be positively transported to the predetermined position.

DESCRIPTION OF THE PREFERRED EMBODIMENT

Figure 1:
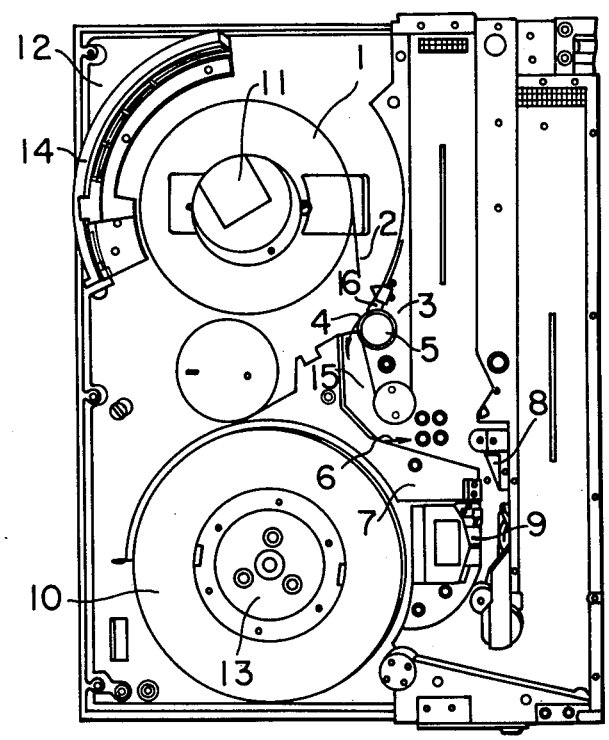
FIG. 1 is a schematic view of a magnetic tape system incorporating the invention therein.
Figure 2:
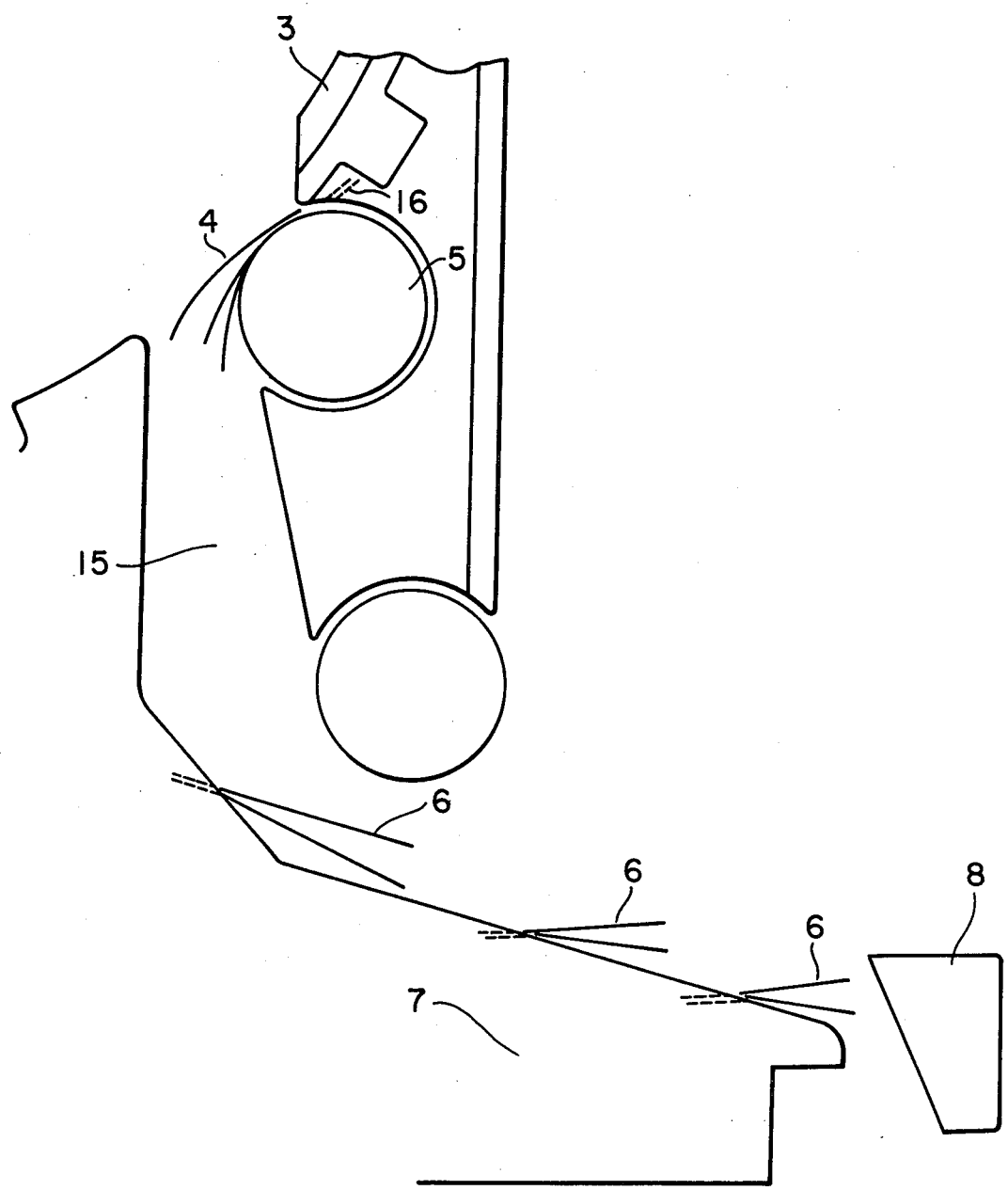
FIG. 2 is a fragmentary schematic view showing, on an enlarged scale, the automatic tape threading device comprising one embodiment of the invention.

As shown in FIGS. 1 and 2, a supply reel 1 is adapted to be mounted on or removed from a hub 11 by an operator. A takeup reel 10, referred to as a machine reel, is affixed to a magnetic tape system 12, with the takeup reel 10 being mounted on a hub 13 formed on its peripheral surface with small apertures for drawing air therethrough into the interior to attract a tape 2. The supply reel 1 may or may not be contained in a threading cartridge. Such cartridge is of an outer diameter large enough to bring the cartridge into contact with a compressed air supply section 14. A threading chute 3 is arcuate at its outer surface located in a position slightly spaced apart from the outer periphery of the cartridge. Located beneath the lower end of the arcuate outer surface of the threading chute 3 is a roller 5 for transporting the tape which is also located at the inlet of a tape passage 15 starting at the lower end of the threading chute 3 and extending downwardly to pass by a magnetic head 9 before reaching the takeup reel 10.

The tape 2 payed out of the supply reel 1 slides on the threading chute 3. When the tape 2 is not contained in a cartridge, the operator rotates the reel 1 to allow the leading end of the tape 2 to slide on the threading chute 3 to the roller 5. When the tape 2 is in a tape cartridge, the aforesaid operation is performed, not manually by the operator, but by streams of air supplied from the compressed air supply section 14. Tape cartridges are commercially available and their description will be omitted. In brief, a tape cartridge provides air streams enclosing the supply reel as a whole and revolving along its outer periphery.

The leading end of the tape 2 reaching the roller 5 drops into the passage 15 by its own weight as the tape 2 is further payed out of the supply reel 1. Means is provided by the invention for ensuring that the leading end of the tape 2 is introduced into the passage 15. More specifically, an air jet ejecting port 16 is provided to attain the end which will be described in detail by referring to FIG. 2. The air jet ejecting port 16 opens above the roller 5 and receives a supply of compressed air. The air jet ejecting port 16 ejects air therethrough at an angle such that the air jet stream 4 issuing from the port 16 flows downwardly along the outer peripheral surface thereof in such a manner that it coils round the roller 5. According to the invention, the air jet ejecting port 16 ejects the air jet stream 4 at an angle of about 50 degrees with respect to the perpendicular. The leading end of the tape 2 is released to the lower end of the curved surface of the threading chute 3 and drops downwardly by its own weight and is aided by the action of the air jet stream 4 in reaching the predetermined position in the passage 15. More specifically, when the leading end of the tape 2 is spaced apart from the curved surface of the treading chute 3 at initial stages of automatic tape threading, the leading end can be drawn by the air jet stream 4 toward the roller 5. When the tape 2 is attracted to the roller 5 by the static buildup thereon, the air jet stream 4 draws the tape 2 apart from the roller 5 and keeps the former in a position spaced apart from the latter by a small clearance. Thus, the tape 2 can be positively transported to the predetermined position without a tape jam.

Being introduced into the threading passage 15 passing by the roller 5, the tape 2 slides on a threading channel 7 while being aided by another air jet stream 6 and is bent at a BT-ET block (tape leading and terminal edge sensing mechanism) 8 to pass around the lower run of a read-write head 9 and reach the takeup reel 10. Air is drawn by suction through the central portion of the takeup reel 10 to draw the tape 2 by suction to wind same on the reel 10.

It will be appreciated that according to the invention, an air jet stream 4 is ejected through a gap between the lower end of the threading chute 3 for the tape 2 payed out of the supply reel 1 to slide down thereon and the roller located in the vicinity of the lower end to cause the tape 2 positively to drop on to the predetermined position. By virtue of this feature, the trouble of the tape 2 passing by the roller inlet or colliding with the roller as experienced in the system of the prior art relying on the force of gravity to cause the tape drop, can be eliminated. Since the tape 2 is separated from the roller 5 by an air jet stream 4, the tape 2 is kept from being attracted to the roller 5 even if it has a static buildup. Imparting of a thrust to a tape 2 eliminates the risk of the tape jamming due to its lack of rigidity. In the case of a tape cartridge, the leading end of the tape 2 is readily withdrawn from the cartridge by the force of the air jet stream 4 tending to draw same from the cartridge. Stated differently, the invention can achieve the effect of positively causing the leading end of a tape 2 to drop on to a predetermined position by the air jet stream 4.

What is claimed is:

1. An automatic tape threading device suitable for use with a tape system comprising a supply reel and a takeup reel arranged vertically in superposed one above the other, comprising:
   a passage having an opening in the vicinity of said supply reel and extending downwardly to said takeup reel for transporting a tape;
   a threading chute located in the vicinity of said supply reel and including an outer surface for guiding a leading end of the tape to the opening, said outer surface ending at the opening of said passage, and
   means located between said outer surface and said opening for generating an air jet stream ejected through said opening toward the interior of said passage.

2. An automatic tape threading device as claimed in claim 1, further comprising a roller interposed between said outer surface and said opening for guiding the tape, and wherein said air jet stream generating means ejects an air jet stream in a direction oriented from above said roller toward the interior of said passage along an outer peripheral surface of said roller.

3. An automatic tape threading device as claimed in claim 2, wherein said air jet stream generating means comprises an air ejecting port opening at a surface of said threading chute juxtaposed against said roller, and means for supplying air to said air jet stream ejecting port.

* * * * *